US012200434B2

(12) United States Patent
Väisänen et al.

(10) Patent No.: US 12,200,434 B2
(45) Date of Patent: Jan. 14, 2025

(54) DIRECTIVE MULTIWAY LOUDSPEAKER WITH A WAVEGUIDE

(71) Applicant: Genelec Oy, Iisalmi (FI)

(72) Inventors: Jussi Väisänen, Iisalmi (FI); Juha Holm, Iisalmi (FI)

(73) Assignee: Genelec Oy, Iisalmi (FI)

( * ) Notice: Subject to any disclaimer, the term of this patent is extended or adjusted under 35 U.S.C. 154(b) by 325 days.

(21) Appl. No.: 17/635,717

(22) PCT Filed: Aug. 20, 2020

(86) PCT No.: PCT/FI2020/050543
§ 371 (c)(1),
(2) Date: Feb. 16, 2022

(87) PCT Pub. No.: WO2021/044078
PCT Pub. Date: Mar. 11, 2021

(65) Prior Publication Data

US 2022/0337941 A1 Oct. 20, 2022

(30) Foreign Application Priority Data

Sep. 3, 2019 (FI) ..................................... 20195727

(51) Int. Cl.
*H04R 1/24* (2006.01)
*H04R 1/02* (2006.01)
(Continued)

(52) U.S. Cl.
CPC ............... *H04R 1/345* (2013.01); *H04R 1/02* (2013.01); *H04R 1/24* (2013.01); *H04R 1/2819* (2013.01);
(Continued)

(58) Field of Classification Search
CPC . H04R 1/345; H04R 1/34; H04R 1/02; H04R 1/24; H04R 1/26; H04R 1/28;
(Continued)

(56) References Cited

U.S. PATENT DOCUMENTS 2,880,817 A * 4/1959 Burns .................. H04R 1/2811 381/349
3,819,879 A * 6/1974 Baechtold .............. H04R 1/225 381/353
(Continued)

FOREIGN PATENT DOCUMENTS

CN 1331852 A * 1/2002 ............. H01Q 1/243
CN 201341229 Y 11/2009
(Continued)

*Primary Examiner* — Edgardo San Martin
(74) *Attorney, Agent, or Firm* — Laine IP Oy

(57) ABSTRACT

The present disclosure provides a loudspeaker including a uniform enclosure having front portion, side portions and back portion defining an inner volume, the front portion is formed as a waveguide surface and includes at least one driver in the waveguide surface and is capable of radiating the main acoustic power of the loudspeaker to direction of first acoustic axis, and an at least one additional driver attached to the enclosure, the additional driver is attached inside the enclosure such that a sub volume is formed inside the inner volume, the sub volume limited by the driver, spacers between the driver and the front portion, and the front portion of the enclosure, at least one first port is adapted to open from the sub volume to ambient volume either to side portion or back portion of the enclosure, and at least one resonator including at least one resonator cavity acoustically connected to the sub volume, the resonator being tuned to at least one of unwanted resonances of the sub volume. The resonator may be formed as a separate unit connected to the uniform enclosure.

20 Claims, 9 Drawing Sheets

(51) Int. Cl.
*H04R 1/28* (2006.01)
*H04R 1/34* (2006.01)

(52) U.S. Cl.
CPC ......... *H04R 1/2849* (2013.01); *H04R 1/2873* (2013.01)

(58) Field of Classification Search
CPC .... H04R 1/288; H04R 1/2807; H04R 1/2811; H04R 1/2819; H04R 1/2849; H04R 1/2873; H04R 1/32; H04R 1/323; H04R 1/40
See application file for complete search history.

(56) References Cited

U.S. PATENT DOCUMENTS

| | | | | | |
|---|---|---|---|---|---|
| 4,314,620 | A * | 2/1982 | Gollehon | H04R 1/2819 181/152 |
| 4,334,593 | A * | 6/1982 | Sechrist | H04R 1/2811 181/144 |
| 4,554,414 | A * | 11/1985 | House | H04R 23/02 381/186 |
| 4,565,905 | A * | 1/1986 | Nation | H04R 9/02 381/186 |
| 5,261,006 | A * | 11/1993 | Nieuwendijk | H04R 1/345 381/345 |
| 5,675,131 | A * | 10/1997 | Saito | H04R 5/02 181/155 |
| 5,793,000 | A * | 8/1998 | Sabato | H04R 1/025 181/182 |
| 5,974,157 | A * | 10/1999 | Tajima | H04R 13/00 381/353 |
| 6,766,027 | B2 * | 7/2004 | Ryan | H04R 1/26 381/386 |
| 7,134,523 | B2 * | 11/2006 | Engebretson | H04R 1/288 381/387 |
| 8,098,867 | B2 * | 1/2012 | Hampton | H04R 1/2803 381/345 |
| 8,351,629 | B2 * | 1/2013 | Parker | H04R 1/2857 381/345 |
| 9,071,908 | B2 * | 6/2015 | Vaisanen | H04R 1/345 |
| 9,894,433 | B2 * | 2/2018 | Bridge | H04R 1/345 |
| 10,299,032 | B2 * | 5/2019 | Grazian | H04R 1/021 |
| 10,397,693 | B1 * | 8/2019 | Tao | H04R 1/025 |
| 10,694,281 | B1 * | 6/2020 | Zastoupil | H04R 1/323 |
| 11,026,017 | B2 * | 6/2021 | Mäkivirta | H04R 1/2842 |
| 11,265,645 | B2 * | 3/2022 | Pavlov | H04R 1/2849 |
| 11,317,223 | B2 * | 4/2022 | Zurbruegg | H04R 25/453 |
| 11,564,032 | B2 * | 1/2023 | Garcia | H04R 1/345 |
| 2004/0252856 | A1 | 12/2004 | Masuda | |
| 2014/0166390 | A1 | 6/2014 | Center et al. | |
| 2014/0193025 | A1 | 7/2014 | Cheng | |

FOREIGN PATENT DOCUMENTS

| | | | |
|---|---|---|---|
| CN | 205160785 | U | 4/2016 |
| CN | 206272841 | U | 6/2017 |
| CN | 207070330 | U | 3/2018 |
| CN | 109874067 | A | 6/2019 |
| DE | 19908631 | A1 | 9/2000 |
| EP | 2464140 | A2 | 5/2012 |
| EP | 2605542 | A1 | 6/2013 |
| EP | 2814262 | A1 | 12/2014 |
| KR | 101805433 | B1 | 12/2017 |
| WO | WO2016055687 | A1 | 4/2016 |
| WO | WO2018193154 | A1 | 10/2018 |

* cited by examiner

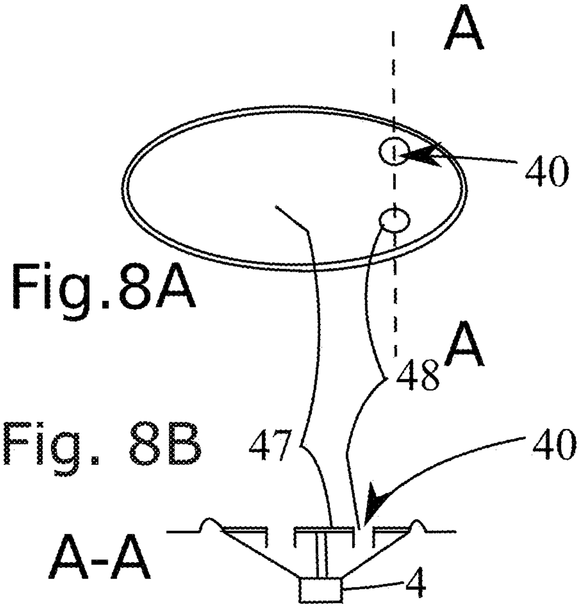
Fig.8A
Fig. 8B
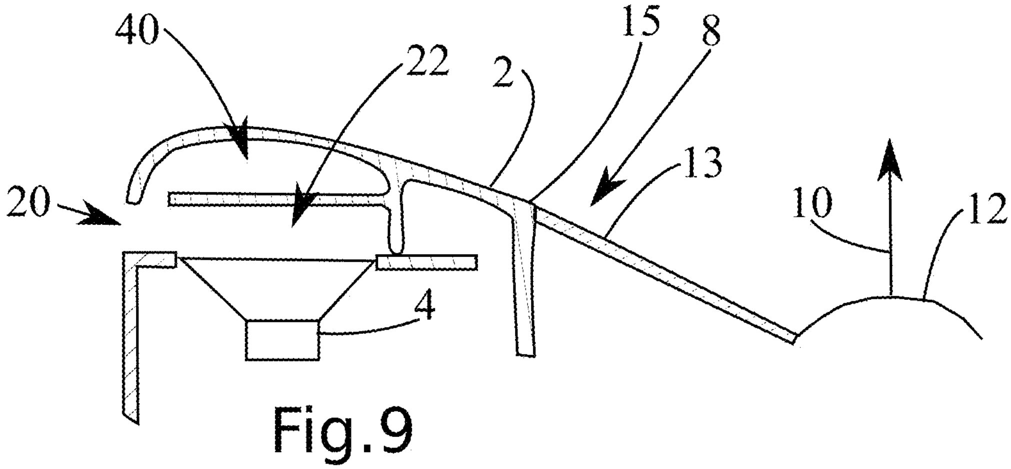
Fig.9

DIRECTIVE MULTIWAY LOUDSPEAKER WITH A WAVEGUIDE

FIELD OF THE INVENTION

The present invention relates to loudspeakers. In particular, the present invention relates to loudspeakers equipped with a waveguide.

PRIOR ART

In the prior art especially loudspeakers with two or more drivers (multiway loudspeakers) have exhibited problems with sound diffractions created by discontinuities on the front baffle surface (Face) of the loudspeaker. In practice the high frequency driver (tweeter) has been the most critical part in this sense. The applicant of the present application has created solutions where the surroundings of the tweeter have been formed as a continuous waveguide for high and midrange frequency audio signals either merely for a tweeter and/or midrange driver or alternatively for a coaxial midrange-tweeter driver.

In this application, these kinds of sound sources are referred to as waveguide drivers and they include any drivers located in the centre of this three dimensional waveguide structure. By these solutions good sound quality and accurate directing of the sound energy may be achieved. However, the frequency range and effectiveness of the waveguide for controlling the directivity of radiation depends on the size of the waveguide, determined to a great extent by the surface area covered by the waveguide, and therefore the size of the front baffle (Face) of the loudspeaker. Small waveguide area limits directivity control to high frequencies, such as the tweeter range only. A large waveguide area enables extending the frequency range of directivity control towards lower frequencies, such as the midrange driver frequency range.

When a smaller size loudspeaker is designed, all the drivers usually cannot be placed in the center of the waveguide (such as the low frequency radiator, the woofer) the surface area taken by these other drivers and the drivers themselves will either limit the baffle area available for the waveguide or additionally create harmful diffractions of audio energy, causing deterioration of the quality of the audio signal audible to the listener.

In the prior art there have been attempts to create a loudspeaker with one or more waveguides on the front side of the loudspeaker. The applicant of the present application has earlier created various solutions like this, e.g. in EP-application 14168925.7 and application PCT/FI2014/050757. In these applications were presented solutions where non-coaxial drivers were positioned such that they are not disturbing the waveguide form created on the front surface (Face) of the enclosure and if positioned on the same surface (the front side (Face) of the enclosure) they are covered with a material that functions advantageously as a solid surface in selected frequencies and restricts penetration of the frequencies emitted by the sound source(s) for which the waveguide has been designed and on the other hand being permeable to other frequencies, more specifically the frequencies radiated by the non-coaxial driver(s), typically woofer(s), emit.

Covering the low frequency driver may cause some problems with the dynamic performance of the driver because the volume displacement of air by the driver requires sufficient openings to allow flow of air. In addition the sub volume in front of the woofer may cause unwanted resonances.

Aim of the Invention

In accordance with the invention at least some of the problems described above are solved by acoustically connecting either resistive or reactive resonators, which are separate elements of the cast enclosure, to the sub volume of the woofer such that the total volume of the loudspeaker stays as small as possible. Advantageously these resonators are located at least partially around the coaxial element. In addition, the aim of the invention is to improve the dynamical performance of the woofer(s).

According to one embodiment of the invention, the loudspeaker includes at least one resonator acoustically connected to the sub volume, the resonator being tuned to at least one of unwanted resonances of the sub volume.

Advantages Gained with the Invention

Considerable advantages are gained with the aid of the present invention.

With help of one embodiment of the invention the low frequency driver may be covered and yet problems with the resonances caused by the sub volume of the woofer may be suppressed. In some embodiments the suppression may take place in multiple frequencies by multiple resonators tuned to different frequencies.

With help of the invention the entire front surface (Face) of the loudspeaker can be formed as a continuous waveguide for mid- and high frequencies without any disturbing resonances on form the sub volume of the bass driver, yet keeping the total volume of the loudspeaker as small as possible. By this measure the whole audio range from 18-20000 Hz may be directed precisely to one “sweet spot” and in addition the rest of the sound energy is divided to the listening room due to the full waveguide form of the loudspeaker such that the loudspeaker enclosure itself does not essentially affect to the frequency response in other directions than the main direction.

In other words, in the traditional loudspeakers where the complete baffle plate is either planar or only partly curved as a waveguide, the signal formed into other directions than the “sweet spot” will be reflected from the walls of the listening room in a non controlled manner. The invention however provides an enclosure where the sound pressure is optimally distributed to all directions, whereby also the wall reflections sound natural to human ear.

Because the resonator is a separate part, it can be processed from different material with different manufacturing procedure than the cast enclosure. This facilitates manufacturing more detailed components like curved or spiral-shaped resonance cavities. In addition this makes it possible to produce different kind of resonators for alternative drivers for the same cast loudspeaker enclosure. The material for the resonator may also be selected freely from plastics to wood based materials and even metal can be used.

BRIEF DESCRIPTION OF DRAWINGS

In the following, certain preferred embodiments of the invention are described with reference to the accompanying drawings, in which:

FIG. 8A presents a front view a woofer in accordance with prior art.

FIG. 8B presents a cross section A-A of a woofer of FIG. 7.

FIG. 9 presents a cross section of a third woofer sub volume in accordance with prior art.

DESCRIPTION OF PREFERRED EMBODIMENTS

List of Used Terms

Figure 1:
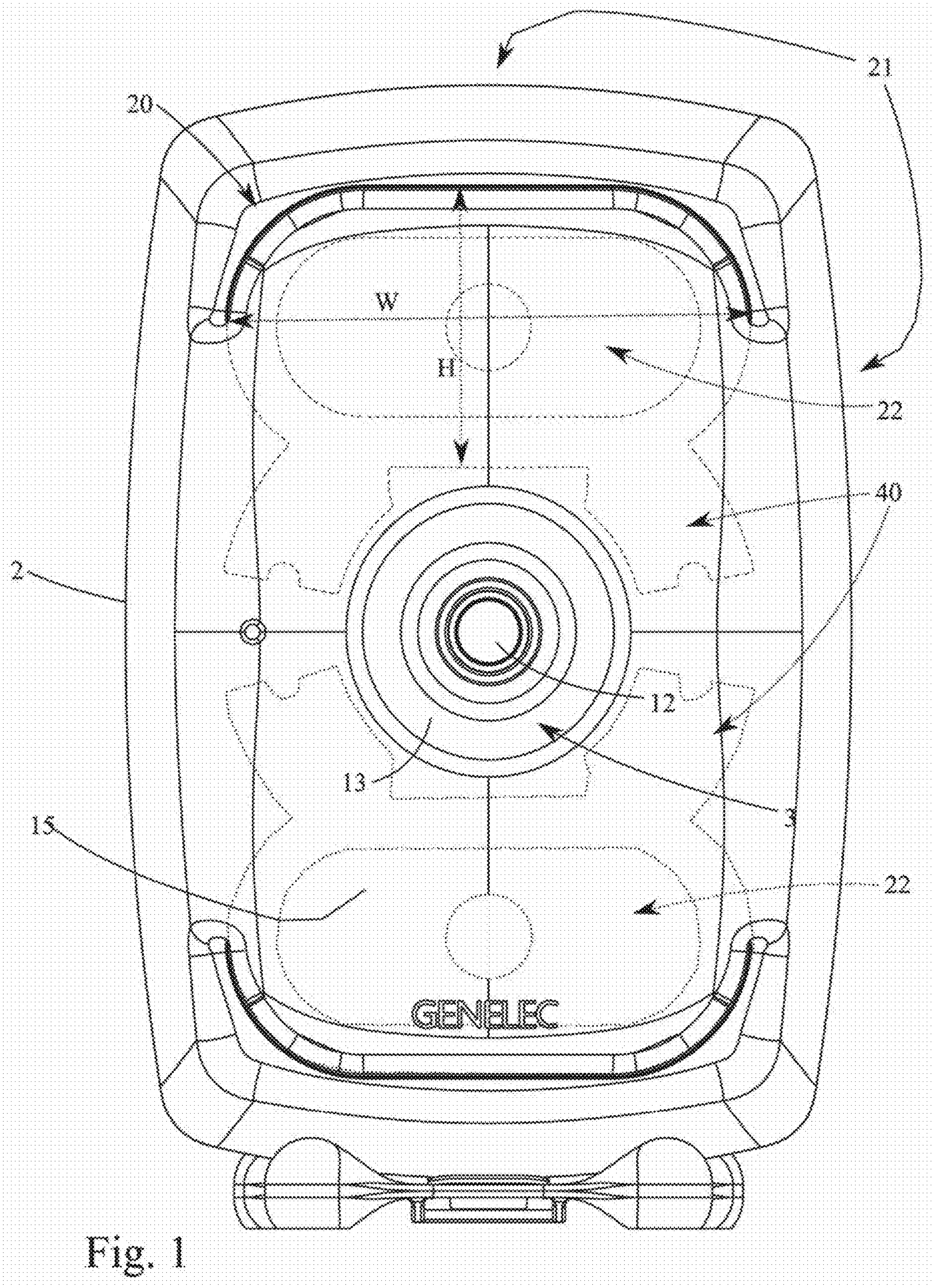
FIG. 1 presents a front view of a loudspeaker according to prior art.

1 loudspeaker
2 enclosure
3 waveguide driver, also coaxial drive or tweeter only
4 woofer, low frequency driver, additional driver
5 front port (opening) for the woofer, low frequency driver having an outer rim on the surface of the enclosure 2 the rim defining a plane of the rim of the front port
6 acoustically selectively transparent layer
7 support structure for the acoustically transparent layer
8 three dimensional waveguide surface, also a front surface (Face) of the enclosure 2 radiating the main acoustic power having a smooth continuous surface with axially symmetrical features around the centre of the waveguide driver 3
9 sweet spot for multiple loudspeakers
10 first acoustic axis
11 second acoustic axis
12 tweeter
13 midrange driver
15 front portion (wall) of the enclosure, (may also be a waveguide surface 8), a frontal baffle portion, the front portion radiating the main acoustic power and including the waveguide surface 8 and having a plane 28 perpendicular to the first acoustic axis 10
B1 frequency band of the waveguide driver 3
B2 frequency band of non-coaxial driver 4
C cross over frequency band between bands B1 and B2
d cavity depth of the panel resonator
20 first port, also side opening having an outer rim defining a first port plane on the enclosure surface.
21 side portion (wall) of the enclosure
22 sub volume, also front space of woofer, low frequency driver, part of the inner volume 27
W width of sub volume
L length of sub volume
23 side wall of the sub volume (front space) forming a spacer between the driver 4 and the enclosure 2, the tangent in the middle of the side wall 23 having an angle different than zero to the plane 28 of the front portion 15, typically an angle around 90 degrees.
25 back portion of the enclosure, having a plane defined by a tangent formed in the middle of the back portion 25 being typically parallel with the plane of the front portion 15. The plane of the back portion 25 may have various different angles in accordance with the invention.
26 ambient volume
27 inner volume of the enclosure 2
28 plane of the front portion
29 plane of the side portion 21, determined by the tangent of the center of this portion
30 plane of the back portion, determined by the tangent of the center of this portion
31 plane of the front port 5
32 plane of the first port 20, the a plane 31 of the front port 5 and a plane 32 of any of the first ports 20 has an angle α greater than 0 degrees, preferably more than 45 degrees when the first port 20 is not located on the back portion 25
33 spacer, a part between the woofer and the front portion 15, either integral part of the enclosure 2 or a separate element
34 reflex port
α angle between the plane 31 of the front port 5 and the plane 32 of the first port 20
40 resonator
40' sub resonator
41 suppressive material of the resonator
43 frequency response of the sub volume
44 frequency response of the resonator
$f_0$ resonance frequency
45 opening or neck of the Helmholtz resonator
46 cavity of the resonator or Helmholtz resonator
47 woofer cover
48 cover tubes
50 panel of the panel resonator
51 resonator unit
52 attachment lug In accordance with FIG. 1 prior art loudspeaker 1, which can at least partially be used in connection with the invention includes a coaxial waveguide driver 3 comprising a tweeter 12 and a midrange driver 13 around it. The coaxial driver 3 is positioned in the centre of the three dimensional waveguide surface 8, also a front surface (Face) of the enclosure 2. The enclosure is typically made of cast metal, advantageously aluminium. Also other castable or moldable materials, such as a combination may be used as a material of the enclosure.

The waveguide surface 8 radiates the main acoustic power of the driver 3. The waveguide 8 has a smooth continuous surface with axially symmetrical features around the centre of the waveguide driver 3. Two woofer drivers 4 are positioned symmetrically on both sides of the waveguide driver 3 inside the enclosure 2 and narrow ports (openings) 20, first ports are formed just behind the waveguide surface for the woofers 4 in order to let the acoustic energy out from the enclosure 2. These first ports 20 are in this embodiment in the narrow front ends of the enclosure 2 and these ports are partially visible from the listening direction. In other words the first port 20 is a U-form slot.

With dashed line are presented the woofers 4 and outlines of the woofer sub volumes 22 and resonators 40 connected to the woofer sub volume 22. The function of the resonators 40 is to suppress resonations of the woofer sub volume 22. These resonators 40 are positioned partially behind the coaxial driver 3 and each sub volume 22 has two resonators on both sides of the coaxial driver 3. The sub volume 22 has width W and height H such that the ratio W/H is around 1.8 and typically in the range of 1.0-5. The resonators 40 are typically an integral part of the enclosure.

The resonators are dimensioned such that the longest dimension, in this time length is $\lambda/4$ or alternatively $\lambda/2$ of the wavelength to be suppressed. In other words if the sub volume 22 has an unwanted resonance at wavelength $\lambda$, the resonator should be $\lambda/4$ long. In frequency domain this means that at resonance $f_0$, $\lambda=v/f_0$, where v is the velocity of sound. Advantageously the resonator 40 is filled with a suppressive material 41 like PES wool, open-cell foam material, fibre glass, mineral wool, felt, or other fibrous or open cell or porous materials, or alternatively of any solid material that is manufactured in the place of the volume such that the material an open cell or fibrous structure where the cell size or the fiber size as in the dimensional area of 1 μm (micrometer) to 1 mm (millimeter).

Figure 2:
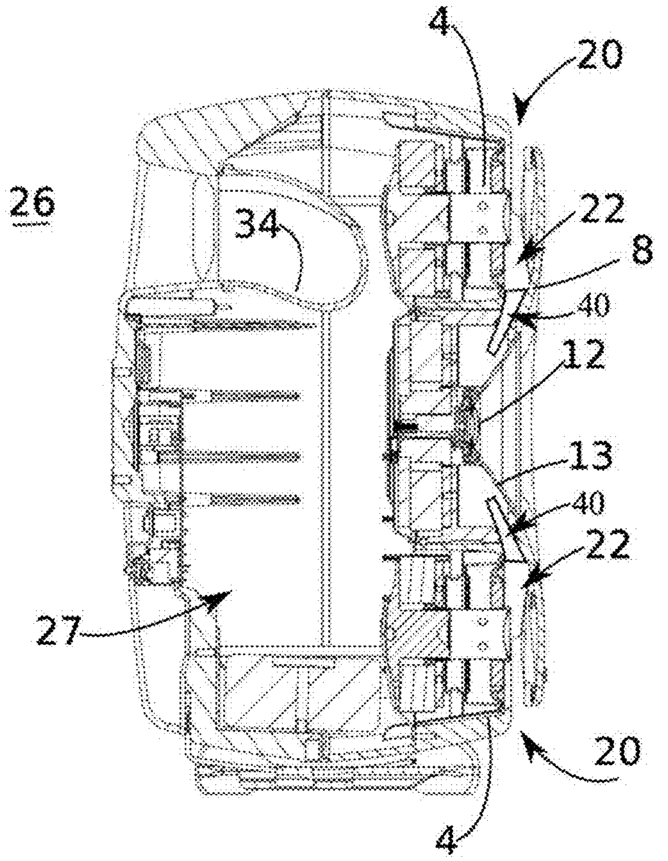
FIG. 2 presents a cross section of a loudspeaker according to FIG. 1.

With reference to FIG. 2, the resonators 40 may be also are located at least partially behind the coaxial driver 3.

Figure 3:
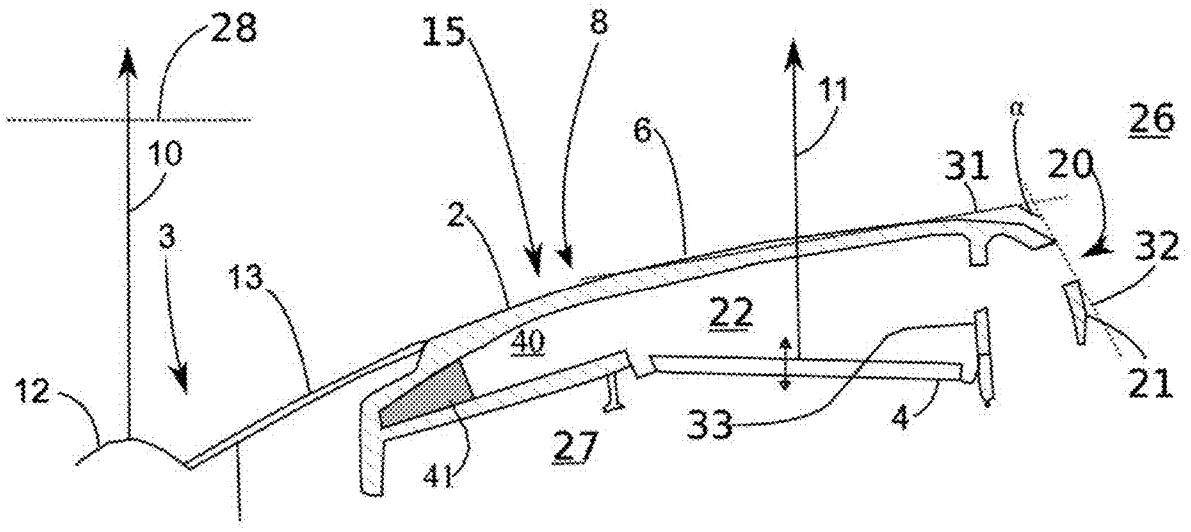
FIG. 3 presents a detailed cross section of a loudspeaker according to FIG. 1.

Referring to FIGS. 2 and 3 the two woofers 4 positioned symmetrically around the coaxial driver form an equivalent large woofer radiating essentially along the same acoustic axis 10 through ports 20 as the waveguide driver 3 even though the woofers have their own acoustic axis 11.

In other words the loudspeaker 1 includes a first driver 3, which is configured to produce a first frequency band B1 and a corresponding first acoustic axis 10, and a second driver 4, which is configured to produce a second frequency band B2, which is different from the first frequency band B1 but may overlap in a cross-over region, and which second frequency band B2 has a second acoustic axis 11. The enclosure 2 encloses said drivers 3, 4 and comprises a three dimensional waveguide 8 positioned on a front surface of the enclosure 2 and around the first driver 3.

As described above the second acoustic axis 11 of individual woofer drivers are non-coaxial with the first acoustic axis 10, however the resultant axis of the multiple symmetrical woofers working together (equivalent woofer driver) has the same acoustic axis as the coaxial driver, waveguide driver 3. This symmetry is however not required in all embodiments of the invention. The axes 10 and 11 may be parallel or non-parallel.

Referring to FIGS. 2 and 3 the woofer 4 is positioned inside the enclosure 2 such that a sub volume 22 is formed in front of the woofer 4 and limited by the woofer 4 itself and side walls 23. The resonator 40 is acoustically connected to the sub volume 22. A suitable suppressing material 41 may be used inside the resonator 40 in order to further attenuate the unwanted frequencies.

The side walls 33 of the sub volume (front space) 22 form a spacer between the driver 4 and the enclosure 2 sealing the sub volume 22 from the rest of the inner volume 27 of the enclosure 2. In more detail the inner volume 27 is limited by the enclosure 2 walls, namely front portion 15, side portions 21 and back portion 25.

Typically the first ports 20 are directed substantially orthogonally in relation to first 10 and second 11 axes, most preferably in the range of 60-120 degrees in relation to these axes. However when the first ports 20 are conducted to the back portion 25 of the enclosure 2, e.g. by channels, the difference between the direction of the first ports 20 and the axes 10 and 11 may be even 180 degrees.

The total area of the first ports 20 is the critical feature, therefore the first ports 20 may be only one single first port 20 for each woofer 4 as presented in the figures or may be formed of multiple first ports 20 like a grid with an area corresponding one single port.

The first ports 20 should not disturb the three dimensional waveguide surface 8, and therefore they are advantageously positioned on the side portions 21 of the enclosure 2. Of course these first ports 20 may be conducted to the back portion 25 of the enclosure 2 by suitable tubes or channels (not shown). In other words the first ports 20 form air passages to areas outside the three dimensional waveguide 8 of the front portion 15 of the enclosure 2.

Figure 4:
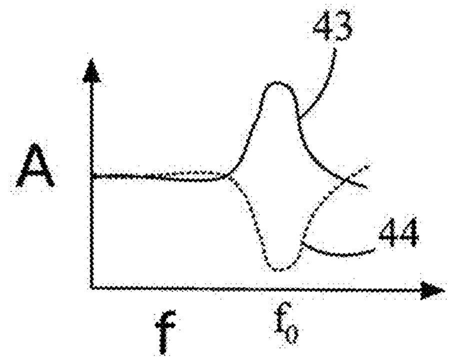
FIG. 4 presents a graph of frequency responses of a woofer cavity and corresponding resonators in accordance with prior art.

The graph of FIG. 4 shows frequency response of the sub volume 22 of the woofer 4 (solid line) with one resonance at $f_0$ and corresponding frequency response of a resonator 40 acoustically connected to the sub volume 22 (dashed line), while the resonator 40 compensates for the unwanted resonance of the sub volume 22.

Figure 5:
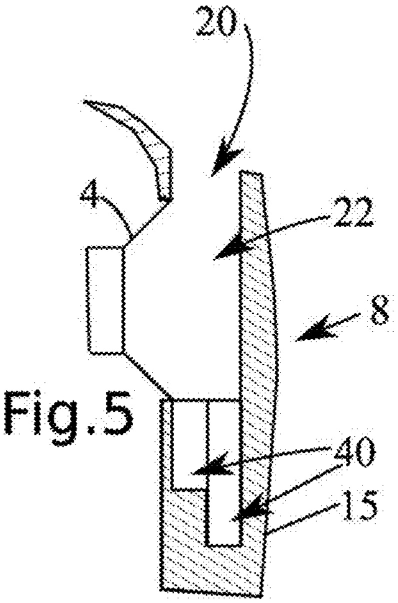
FIG. 5 presents a cross section of a woofer sub volume in accordance with prior art.

FIG. 5 shows an alternative embodiment with two resistive resonators 40 with different lengths for two unwanted frequencies of the sub-volume. Also one or two resistive broad band resonator may be used, advantageously filled with suppressive material. In this case the mechanical dimensions (length, width and depth) of the resonator cavity define the tuning frequency or frequencies of the resonator.

Figure 6:
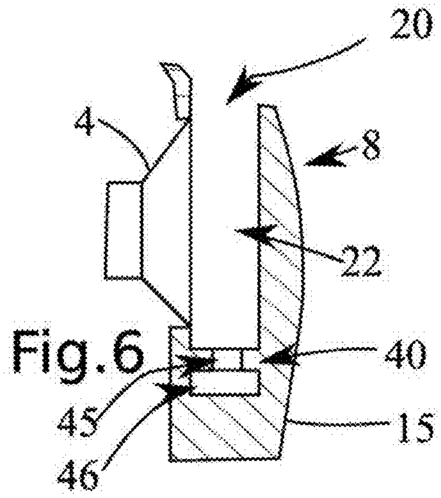
FIG. 6 presents a cross section of a second woofer sub volume in accordance with prior art.

FIG. 6 shows an alternative embodiment with one reactive Helmholtz resonator 40. In general reactive resonators have high quality factor and they are very effective narrow band resonators. Also these type of resonators can be installed several in one sub volume 22 if there are several sharp unwanted resonances. This type of resonator is also tuned to the unwanted frequency or frequencies $f_0$. The dimensioning of the Helmholtz resonator is explained in the following:

The resonance arises from the effect of the acoustic air mass neck of the resonator 40 and the series resonance circuit created by the acoustic compliance of the air volume of the chamber of the resonator. Close to the resonance frequency, the Helmholtz resonator attenuates the unwanted resonance of sub volume 22. The neck-cavity system of the resonator 40, can be derived from the air volume of the cavity of the resonator and the diameter of the neck and its length.

$$f_0 = \frac{c}{2\pi}\sqrt{\frac{A}{LV}}$$

in which $f_0$ is the resonance frequency, c is the speed of sound, A is the cross-sectional area of the neck, L is the length of the neck, and V is the volume of the chamber.

Figure 7:
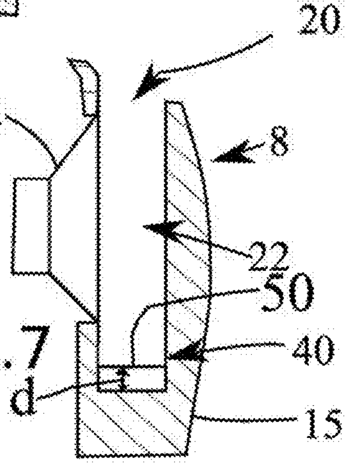
FIG. 7 presents a cross section of a third sub volume in accordance with prior art.

FIG. 7 shows an alternative embodiment with one reactive panel resonator as a resonator. This embodiment is dimensioned in the following way based on the panel 50 mass per unit and cavity depth d:

Panel resonator/membrane absorber resonant frequency f is defined in the following way:

$$f=60\sqrt{md}$$

where m m=acoustic mass per unit area of panel 50 ($kg/m^2$)

d=cavity depth

Stiffness of the membrane fixing is assumed to be negligible

FIG. 8A shows as a top view a woofer 4 having a planar cover 47 and short tubes 48 forming as well a Helmholtz resonator where the tubes are the necks and the volume between the cover and the woofer cone forms the volume of the resonator. In FIG. 8B this solution is presented as a A-A cross section. The tuning principle is the same as in FIGS. 5 and 6.

FIG. 9 shows another alternative solution, where the resonator 40 is formed between the frontal baffle portion and 15 and the sub volume 22 of the woofer. The resonator may be either resistive type without any neck portion or reactive type if the opening to the sub volume 22 is made as a tube. The tuning principle is the same as in previous figures.

Typically the loudspeaker in accordance with the invention functions in accordance with well-known bass reflex principle, where the low frequency driver 4 is tuned in resonance with help of the compliance of the air volume contained inside the enclosure 27 and the air volume contained inside the reflex port 34 of FIG. 2.

One embodiment of the prior art which can be used at least partially with the invention (FIGS. 10-11) can be also described in the following way:

The loudspeaker 1 comprises an enclosure 2 defining an inner volume 27 and including a frontal baffle portion 15 (front portion), which has a front port 5 for providing a fluid passageway between the inner volume 27 and the ambient volume 26 of the enclosure 2 and a side portion 21 extending rearward from the periphery of the baffle portion 15. The side portion 21 forms side walls or the enclosure 2. The enclosure further includes a back portion 25, which is typically essentially parallel with the frontal baffle portion 15 and forming the back side of the enclosure 2. The loudspeaker 1 further comprises a driver 4 attached to the enclosure 2, such that the driver 4 is arranged at a distance from the baffle portion 15, forming a sub volume 22 inside the enclosure 2 such that a sub volume 22 is formed between the driver 4 and the baffle portion 15 by a spacer 33, wherein said front port 5 acts as a front port between the sub volume 22 and the ambient volume 28 of the enclosure 2. In accordance with this embodiment a first port 20 is formed to the enclosure 2 either in the side portion 21 or back portion 25 in order to connect the sub volume 22 and the ambient volume 26 with each other.

Figure 10:
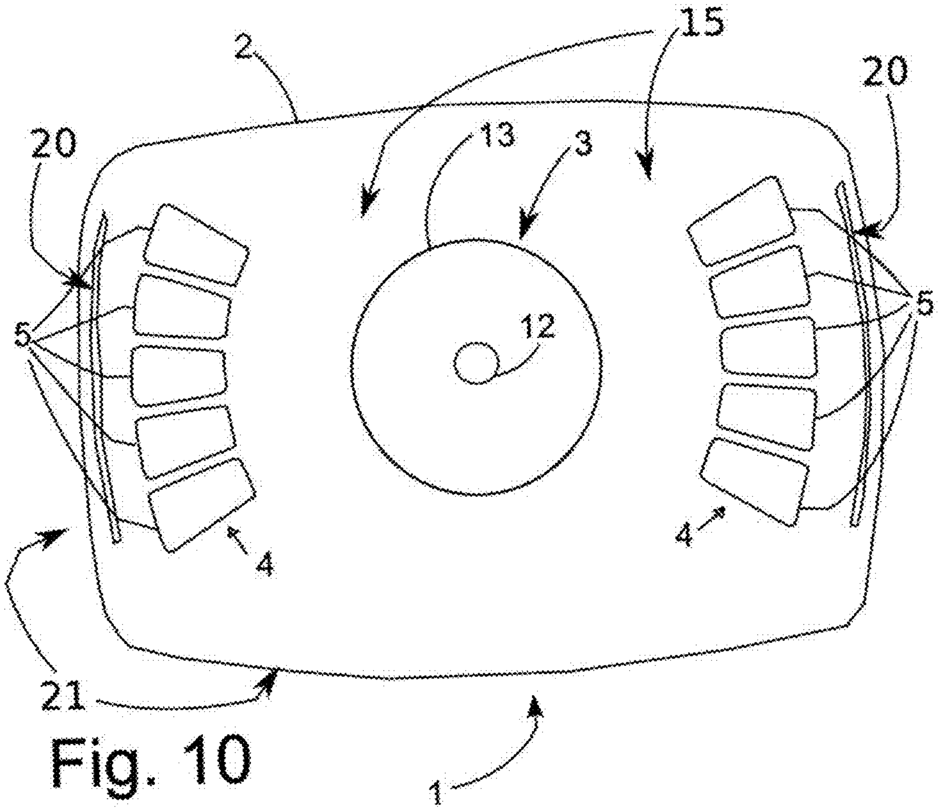
FIG. 10 presents a front view of a loudspeaker according to one alternative embodiment of prior art.

In accordance with FIG. 10 one embodiment of the invention two woofer drivers 4 are positioned on both sides of the waveguide driver 3 inside the enclosure 2 and suitable ports (openings) 5 are formed for the woofers 4 in order to let the acoustic energy out from the enclosure 2.

Figure 11:
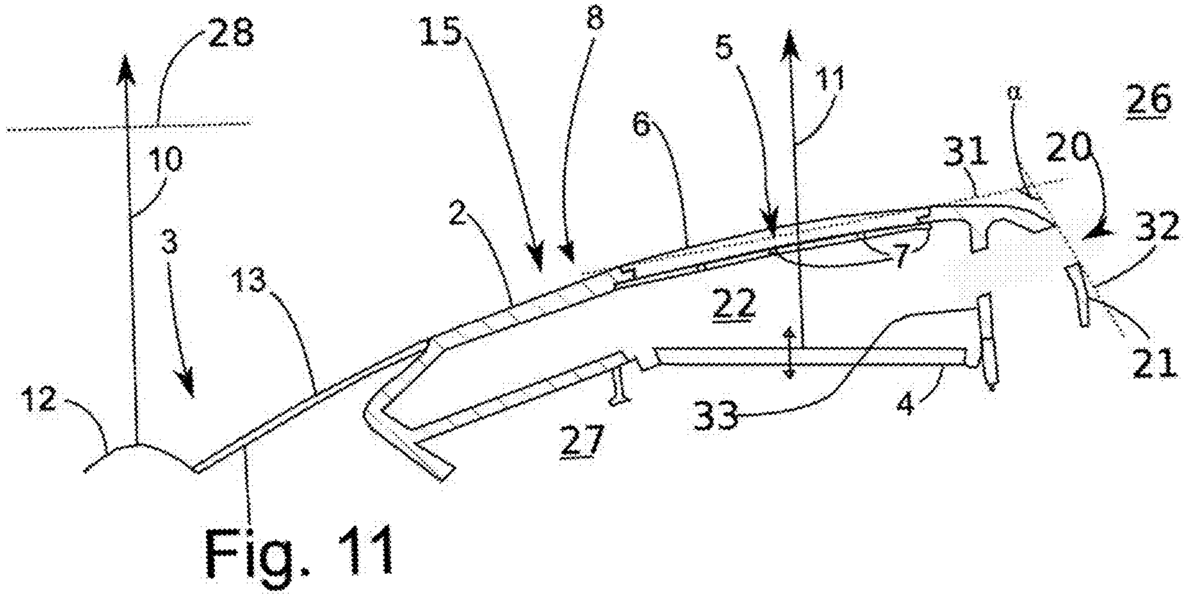
FIG. 11 presents a cross section of a loudspeaker according to FIG. 9.

With reference to FIG. 11, the openings 5 are covered with an acoustically transparent layer 6 forming part of the waveguide surface 8. If needed the acoustically transparent layer 6 may be supported from below with support bars 7. The woofer driver 4 is typically spaced from the acoustically transparent layer 6.

Referring to FIG. 10 the two woofers 4 form an equivalent large woofer radiating essentially along the same acoustic axis 10 as the waveguide driver 3 even though the woofers have their own acoustic axis 11.

In other words the loudspeaker 1 includes a first driver 3, which is configured to produce a first frequency band B1 and a corresponding first acoustic axis 10, and a second driver 4, which is configured to produce a second frequency band B2, which is different from the first frequency band B1 but may overlap in a cross-over region, and which second frequency band B2 has a second acoustic axis 11. The enclosure 2 encloses said drivers 3, 4 and comprises a three dimensional waveguide 8 positioned on a front surface of the enclosure 2 and around the first driver 3. The three dimensional waveguide 8 comprises an acoustically selectively transparent portion 6 which is acoustically essentially reflecting to sound waves of the first frequency band B1 propagating in a direction angled to the first acoustic axis 10, the waveguide portion 6 is essentially transparent to sound waves of the second frequency band B2 propagating in the direction of the second acoustic axis through the waveguide portion 6, and the second driver 4 is positioned inside the enclosure 2 behind the acoustically selectively transparent portion 6.

As described above the second acoustic axis 11 of individual woofer drivers are non-coaxial with the first acoustic axis 10, however the resultant axis of the multiple woofers working together (equivalent woofer driver) has the same acoustic axis as the coaxial driver, waveguide driver 3. This symmetry is however not required in all embodiments of the invention. The axes 10 and 11 may be parallel or non-parallel.

Referring to FIGS. 10 and 11 the woofer 4 is positioned inside the enclosure 2 such that a sub volume 22 is formed in front of the woofer 4 and limited by the woofer 4 itself, side walls 23 and the acoustically selectively transparent layer 6. To the sub volume 22 is connected a resonator 40, which is tuned to unwanted frequencies created by the sub volume 22. The resonator 40 may be either resistive or reactive. With resistive resonator the suppressive characteristics are of broad band type. In other words the notch around the center frequency $f_0$ created by resistive resonator is not so sharp like in the reactive resonators. The side walls 33 of the sub volume (front space) 22 form a spacer between the driver 4 and the enclosure 2 sealing the sub volume 22 from the rest of the inner volume 27 of the enclosure 2. In more detail the inner volume 27 is limited by the enclosure 2 walls, namely front portion 15, side portions 21 and back portion 25.

In some embodiments of the invention the acoustically selectively transparent layer 6 may be replaced by a mechanically protective grid, the grid limiting in this case the sub volume, as well as the inner volume 27. Advantageously the first ports 20 are formed in the side walls 23 of the sub volume 22 and to the side portions 21 of the enclosure 2 in order to optimize the operation of the woofer 4. Without these first ports 20 the performance of the woofer 4 may be compromised. The first ports 20 may be positioned on any of the side portions 21, e.g. on the short side portions 21 as shown in the figures or alternatively to the long side portions 21.

Typically the first ports 20 are directed substantially orthogonally in relation to first 10 and second 11 axes, most preferably in the range of 60-120 degrees in relation to these axes. However when the first ports 20 are conducted to the back portion 25 of the enclosure 2, e.g. by channels, the difference between the direction of the first ports 20 and the axes 10 and 11 may be even 180 degrees.

The area of these first ports 20 is typically 5-50% of the area of the openings 5 for the woofer 4, most advantageously in the range of 10-20% of the area of the openings 5 for the woofer 4. The total area of the first ports 20 is the critical feature, therefore the first ports 20 may be only one single first port 20 for each woofer 4 as presented in the figures or may be formed of multiple first ports 20 like a grid with an area corresponding one single port.

The first ports 20 should not disturb the three dimensional waveguide surface 8, and therefore they are advantageously positioned on the side portions 21 of the enclosure 2. Of course these first ports 20 may be conducted to the back portion 25 of the enclosure 2 by suitable tubes or channels (not shown). In other words the first ports 20 form air passages to areas outside the three dimensional waveguide 8 of the front portion 15 of the enclosure 2.

Typically the second driver 4 is positioned inside the enclosure 2 behind the acoustically selectively transparent portion 6 and spaced from it, such that a sub volume 22 is formed inside the enclosure 2 and separated from the inner volume 27 by the driver 4 and side walls 23 formed as a spacer between the driver 4 and the front portion 15 of the enclosure 2.

In connection with the acoustically selectively transparent layer 6 essentially reflecting means reflection or absorption of at least 50-100% of the acoustic energy, preferably in the range of 80-100%.

In the same way essentially transparent means transparency of at least 50-1$^{00}$% of the acoustic energy preferably in the range of 80-100%.

In the following additional advantageous properties of the acoustically selectively transparent layer 6 are presented:

The thickness of the layer 6 is advantageously:

felt, about 1 . . . 5 mm thick open cell plastic foam, about 1-20 mm thick, pore diameter less than 1 mm thin fabrics as such or as a part of the layer 6

The layer 6 should attenuate the acoustical radiation of the waveguide driver 3, meaning typically in frequencies above 600 Hz.

In other words the layer 6 should have an acoustical impedance (or absorption) as a function of frequency therefore functioning as an acoustical filter in the following way:

lowpass when the sound from woofer driver 4 is going through attenuation (e.g. caused by turbulence or absorption with high losses) for high frequencies from waveguide driver 3 causing strong reflection of the acoustic waves at mid and high frequencies high reflectance for high frequencies of the driver 3

Advantageously the layer 6 is formed of holes or pores or their combination in the following way:

if single layer 6 is used holes should have smaller diameter than 1 mm if multiple layers 6 are used holes with diameter smaller than 1 mm, may work also, if multiple layers 6 are used holes with diameter larger than 1 mm, may work (not tested yet)

microstructure like felt and open celled plastic work

The properties for the ideal material for layer 6 are the following:

gas permeable (=porous)

low acoustical losses up to the crossover frequency C (woofer 4)

high acoustical reflectance slightly above the crossover frequency c known materials fulfilling the above criteria:

felt, about 1 . . . 5 mm thick open cell plastic foam, about 1-20 mm thick, pore diameter less than 1 mm The layer 6 may cover the loudspeaker front (tweeter 12 excluded) or only the holes 5.

The layer 6 may be also formed as a metal structure, like mesh or grid with on one or several layers in accordance with the above requirements for porosity and frequency properties. This kind of structure could be formed e.g. by a stack of perforated metal sheets or plates of thickness around 0.2-2 mm. The properties of this kind of stack could be adjusted by placement (distribution) of the holes or pores, percentage (openness) of the holes or pores, and the spacing of the plates from each other. The hole or aperture diameter may vary typically around 0.3–3 mm. The spacing between the sheets or plates is typically around 0.2-2 mm.

A metal structure described above is advantageous, because its propertied can be adjusted freely and the external properties like colour can be as well selected without limitations.

The crossover frequency C is typically the following:

low frequency f<600 Hz (woofer output range)

high frequency f>600 Hz (midrange and/or tweeter output range)

In accordance with the invention in combination with the large waveguide 8:

woofer 4 is placed behind the waveguide surface 8 two or more (e.g. 4) woofers 4 can be used in order to obtain directivity, woofers may be positioned symmetrically in relation to the coaxial driver Also an embodiment with only one woofer is possible, however directivity for low frequencies will not be obtained beyond what is provided by the size of the air displacing surface of the woofer in combination with the size of the front baffle of the loudspeaker enclosure.

In alternative embodiments of the invention the selectively transparent portion 6 may be replaced by a mechanically protective grid not having complete properties of selective transparency.

Figure 12:
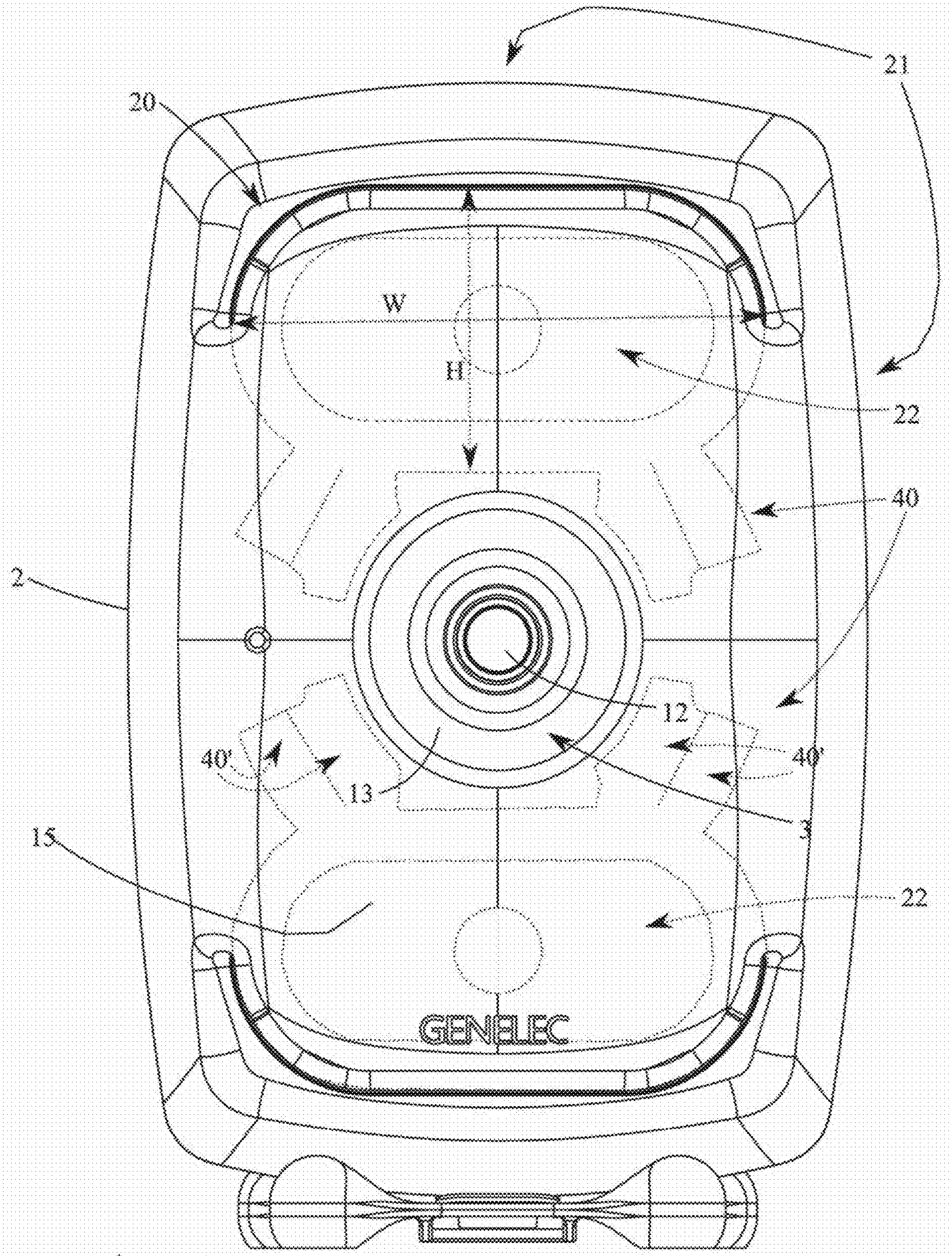
FIG. 12 presents a front view of a loudspeaker according prior art.

In accordance with FIG. 12 the resonator may be divided into multiple independent sub resonators 40', each having its own resonance frequency.

Figure 13:
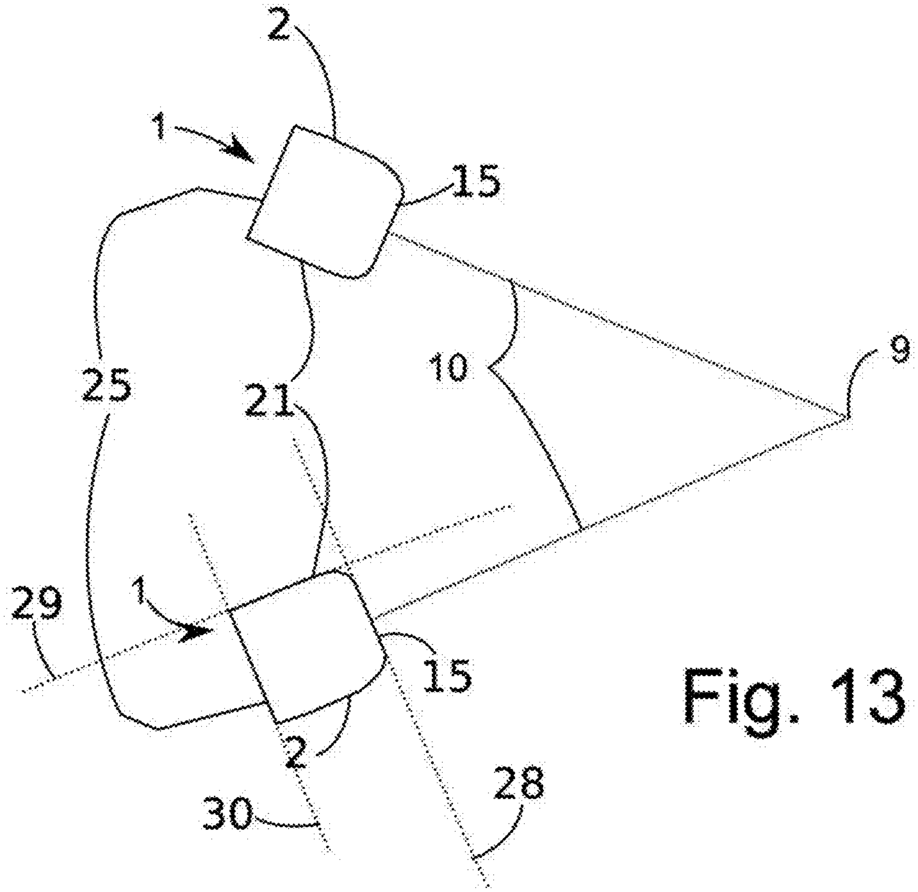
FIG. 13 presents a view of a loudspeaker system according to one preferred embodiment of prior art.

FIG. 13 shows the typical positioning of the loudspeakers 1 in accordance with the invention, where the loudspeakers are directed to the listening position, sweet spot 9. Due to the fact that the complete front surface of the enclosure 2 is formed as a waveguide 8, a very good directivity is achieved. Additionally the waveguide form 8 causes a uniform distribution of all frequencies to all directions in the listening room and therefore the reflections from the walls, ceiling and floor cause no coloration of the sound. FIG. 13 indicates also the front portion 15, side portions 21 and back portion 25 of the loudspeaker 1 enclosure 2.

Figure 14:
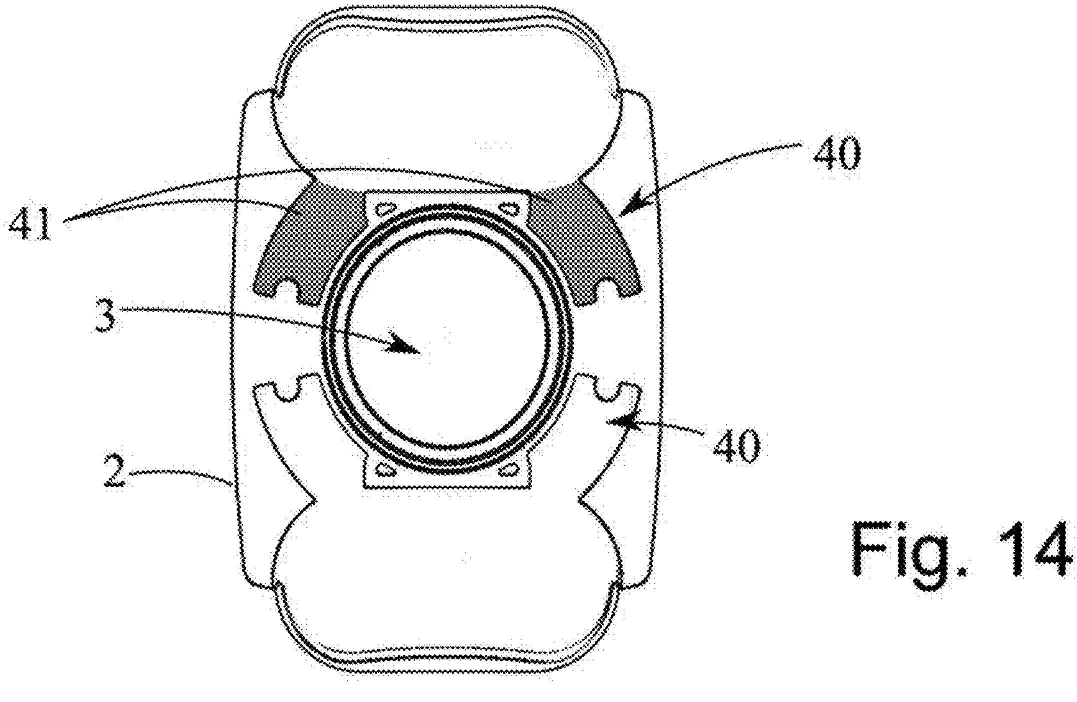
FIG. 14 presents a cross sectioned view of a loudspeaker according to one preferred embodiment of prior art.

In FIG. 14 is presented a loudspeaker in which suppressive material 41 is positioned in the resonator cavity 40. Only the upper cavities 40 in the figure are filled with the material but in reality both upper and lower cavities 40 will be filled with suppressive material.

Figure 15:
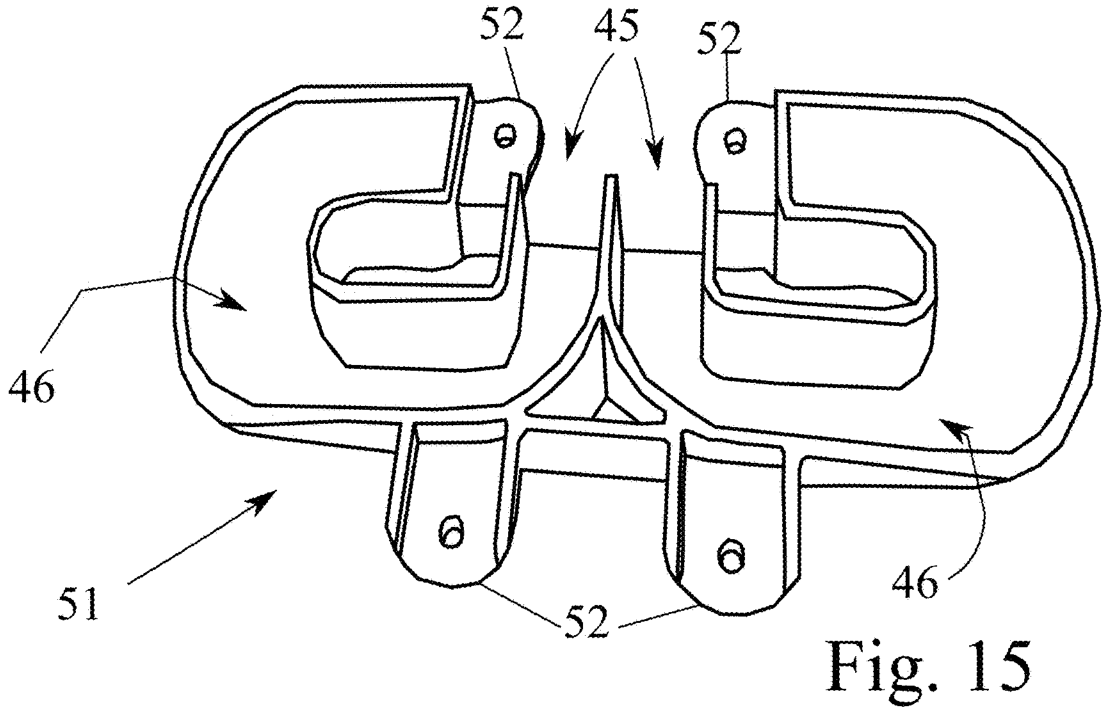
FIG. 15 presents a resonator unit in accordance with the invention.

In accordance with FIG. 15 the resonator unit 51 is typically made of plastic. Other materials like moldable wood or metal can also be used. FIG. 15 shows the side of the resonator 51 which will be attached to the front plate 15 of the cast enclosure. The attachment is made typically by screws from the attachment lugs 52. The resonator unit is typically conical such that the highest part of the unit is in the center close to the resonator openings 45 and the edges of the unit 51 are correspondingly low. Because the resonator unit 51 is separate from the large cast metal enclosure also detailed structures can be made. In this case the resonator cavity is made strongly curved in order to obtain the desired length for the resonator cavity in as small total dimension for the resonator unit 51 as possible.

Figure 16:
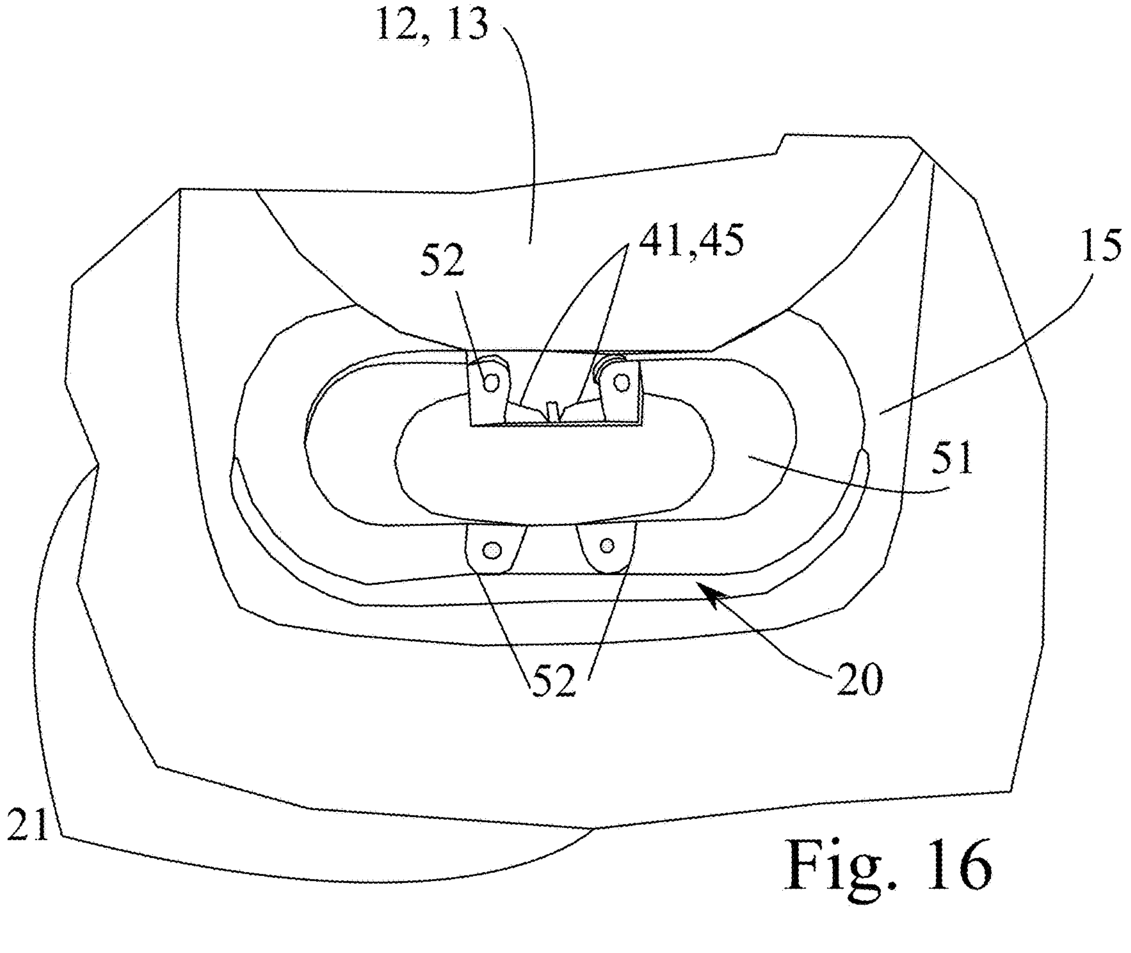
FIG. 16 presents a resonator unit in accordance with the invention connected to the front portion of the enclosure inside the loudspeaker.

FIG. 16 shows the resonator unit 51 connected to the cast metal enclosure, especially to the front portion 15 of the enclosure such that the resonator openings 45 are directed to the coaxial driver including tweeter 12 and midrange driver 13. So the openings 45 of the resonator unit 51 are directed away from the first port 20 of the loudspeaker. In FIG. 16 can also be seen suppressive material 41 positioned in the cavities and extending to the openings 45 of the cavities.

Figure 17:
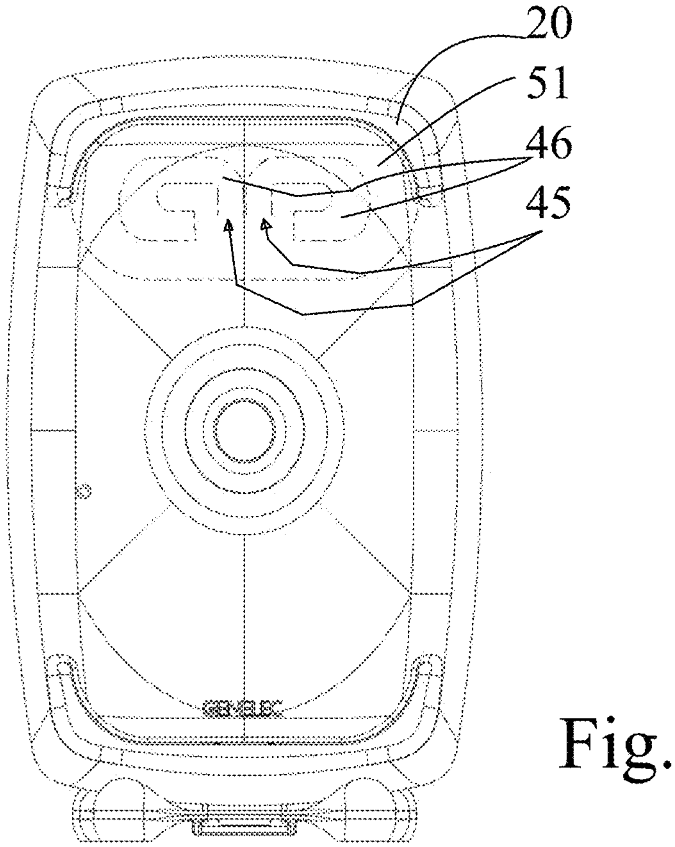
FIG. 17 presents as a front view the loudspeaker in accordance with the invention such that the resonator unit is presented with a dashed line
Figure 18:
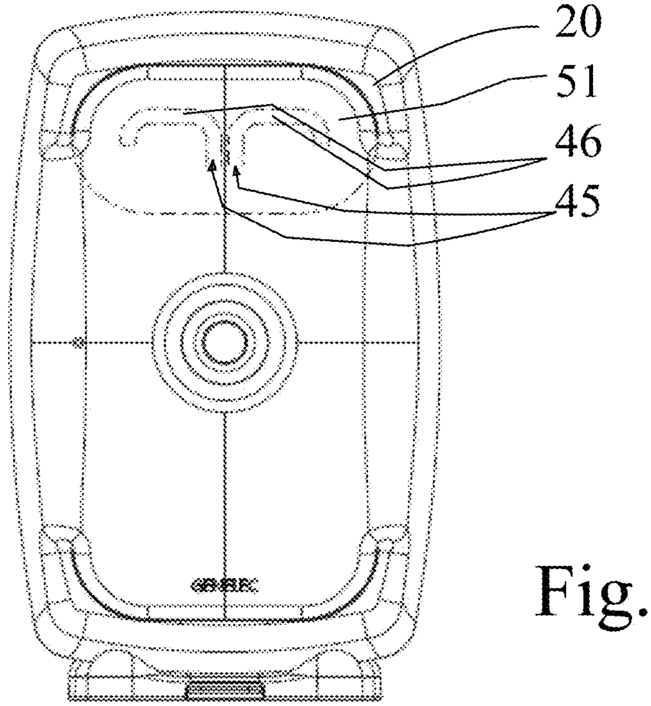
FIG. 18 presents as a front view another loudspeaker in accordance with the invention such that the resonator unit is presented with dashed line

FIGS. 17 an 18 show to embodiments of the resonator units as dashed lines. Only one resonator unit 51 for each loudspeaker is presented but of course, also a second resonator unit is located in the bottom part of each loudspeaker.

The dimensioning of the resonator cavities 46 is made in connection with FIGS. 15-18 with the same principles as described in connection with other figures, especially FIGS. 4-9.

Typically the uniform loudspeaker enclosure 2 is made by casting or moulding of metal, plastic or wood based material.

The invention claimed is:

1. A loudspeaker comprising:

a uniform enclosure having a front portion, side portions and a back portion defining an inner volume, wherein:

the front portion is formed as a waveguide surface and includes at least one first driver in the waveguide surface and is capable of radiating the main acoustic power of the loudspeaker to the direction of the first acoustic axis, at least one additional driver attached to the enclosure, wherein:

the additional driver is attached inside the enclosure such that a sub volume is formed inside the inner volume, the sub volume limited by the driver, spacers between the driver and the front portion, and the front portion of the enclosure, at least one first port adapted to open from the sub volume to the ambient volume, to either the side portion or the back portion of the enclosure, and at least one resonator comprising at least one resonator cavity acoustically connected to the sub volume, the resonator being tuned to at least one of the unwanted resonances of the sub volume, wherein:

the resonator is formed as a separate unit connected to the uniform enclosure, and the resonator unit is connected to the inside surface of the front portion of the enclosure.

2. The loudspeaker in accordance with claim 1, wherein the resonator unit is made of plastic, wood based material or metal.

3. The loudspeaker in accordance with claim 1, wherein the resonator unit comprises one or more curved cavities with openings.

4. The loudspeaker in accordance with claim 1, wherein the openings of the resonator unit are directed away from the first port of the loudspeaker.

5. The loudspeaker in accordance with claim 1, wherein the resonator is a resistive resonator with broad band characteristics.

6. The loudspeaker in accordance with claim 1, wherein the resonator comprises attenuating material like PES wool, open-cell foam material, fiber glass, mineral wool, felt, or other fibrous or open cell or porous materials, or alternatively comprises any solid material that is manufactured in the place of the volume such that the material comprises open cell or fibrous structure where the cell size or the fiber size is in the dimensional area of 1 μm to 1 mm.

7. The loudspeaker in accordance with claim 1, wherein the resonator is a reactive resonator.

8. The loudspeaker in accordance with claim 1, wherein the sub volume has a width (W) and length (L) such that the ratio W/L is in the range of 1.2-2.5.

9. The loudspeaker in accordance with claim 1, wherein a plane of the front port and a plane of any of the first ports has an angle α greater than 0 degrees.

10. The loudspeaker in accordance with claim 1, wherein the acoustic axis of the additional driver is non-coaxial with the first acoustic axis.

11. The loudspeaker in accordance with claim 1, wherein the acoustic axis of the additional driver is not parallel with the first acoustic axis.

12. The loudspeaker in accordance with claim 1, wherein the first driver comprises two drivers coaxial with each other.

13. The loudspeaker in accordance with claim 1, wherein the first driver includes only one driver.

14. The loudspeaker in accordance with claim 1, wherein the loudspeaker is a bass-reflex loudspeaker.

15. The loudspeaker in accordance with claim 1, wherein the uniform enclosure is made by casting or molding of metal, plastic or wood based material.

16. The loudspeaker in accordance with claim 1, wherein the uniform enclosure is made by machining of metal, plastic or wood based material.

17. The loudspeaker in accordance with claim 1, wherein the at least one driver is in the center of the waveguide surface.

18. The loudspeaker in accordance with claim 1, wherein the resonator is a panel resonator or Helmholtz resonator.

19. The loudspeaker in accordance with claim 1, wherein the sub volume has a width (W) and length (L) such that the ratio W/L is around 1.8.

20. The loudspeaker in accordance with claim 1, wherein a plane of the front port and a plane of any of the first ports has an angle α greater than 45 degrees when the first port is not located on the back portion.

* * * * *